United States Patent [19]

Ballard et al.

[11] Patent Number: 4,845,640
[45] Date of Patent: Jul. 4, 1989

[54] HIGH-SPEED DUAL MODE GRAPHICS MEMORY

[75] Inventors: Robert S. Ballard, West Linn, Oreg.; Steven D. Clark, Pittsburgh, Pa.

[73] Assignee: Megascan Technology, Inc., Gibsonia, Pa.

[21] Appl. No.: 24,689

[22] Filed: Mar. 11, 1987

[51] Int. Cl.⁴ ............................................. G06F 15/62
[52] U.S. Cl. .................................. 364/518; 364/521; 364/900; 340/798
[58] Field of Search ........ 364/518, 521, 900 MS File; 340/721, 747, 798, 799, 724

[56] References Cited

U.S. PATENT DOCUMENTS

| Re. 31,200 | 4/1983 | Sukonick et al. | 340/724 |
|---|---|---|---|
| 4,555,775 | 11/1985 | Pike | 364/900 |
| 4,622,545 | 11/1986 | Atkinson | 340/747 |
| 4,663,729 | 5/1987 | Matick et al. | 364/900 |
| 4,679,038 | 7/1987 | Bantz et al. | 340/721 |
| 4,706,213 | 11/1987 | Bandai | 364/900 |

OTHER PUBLICATIONS

Sproull, R. F., Sutherland, I. E., Thompson, A., Gupta, S., Minter, C.; The 8×8 Display, Carnegie-Mellon University, Pittsburgh, Pa., Dec. 81.
BITBLT Processor, Electronic News, p. 38, 1/26/87.

Primary Examiner—Gary V. Harkcom
Assistant Examiner—Randy W. Lacasse
Attorney, Agent, or Firm—Weingarten, Schurgin, Gagnebin & Hayes

[57] ABSTRACT

A high-speed graphics memory providing line mode and area mode data transfer at high speeds comprises a frame buffer structure, with unique address alignment and corresponding data manipulation to provide line mode and area mode pixel data transfer of comparable time intervals. The frame buffer comprises independently addressable 16 byte-wide video memories. The 16 memories provide a 128-bit contiguous horizontal pixel sequence in the line mode, and provide a two-dimensionally contiguous array of pixels comprising 8 bits by 2 bytes when in the area mode, from which an 8×8 bit area is selected at any address location in the entire image bit map. The pixels included in a particular line mode or area mode data transfer are directly addressable by external equipment, such as graphics processors, to provide a high-speed graphic display system.

13 Claims, 3 Drawing Sheets

IMAGE BIT MAP

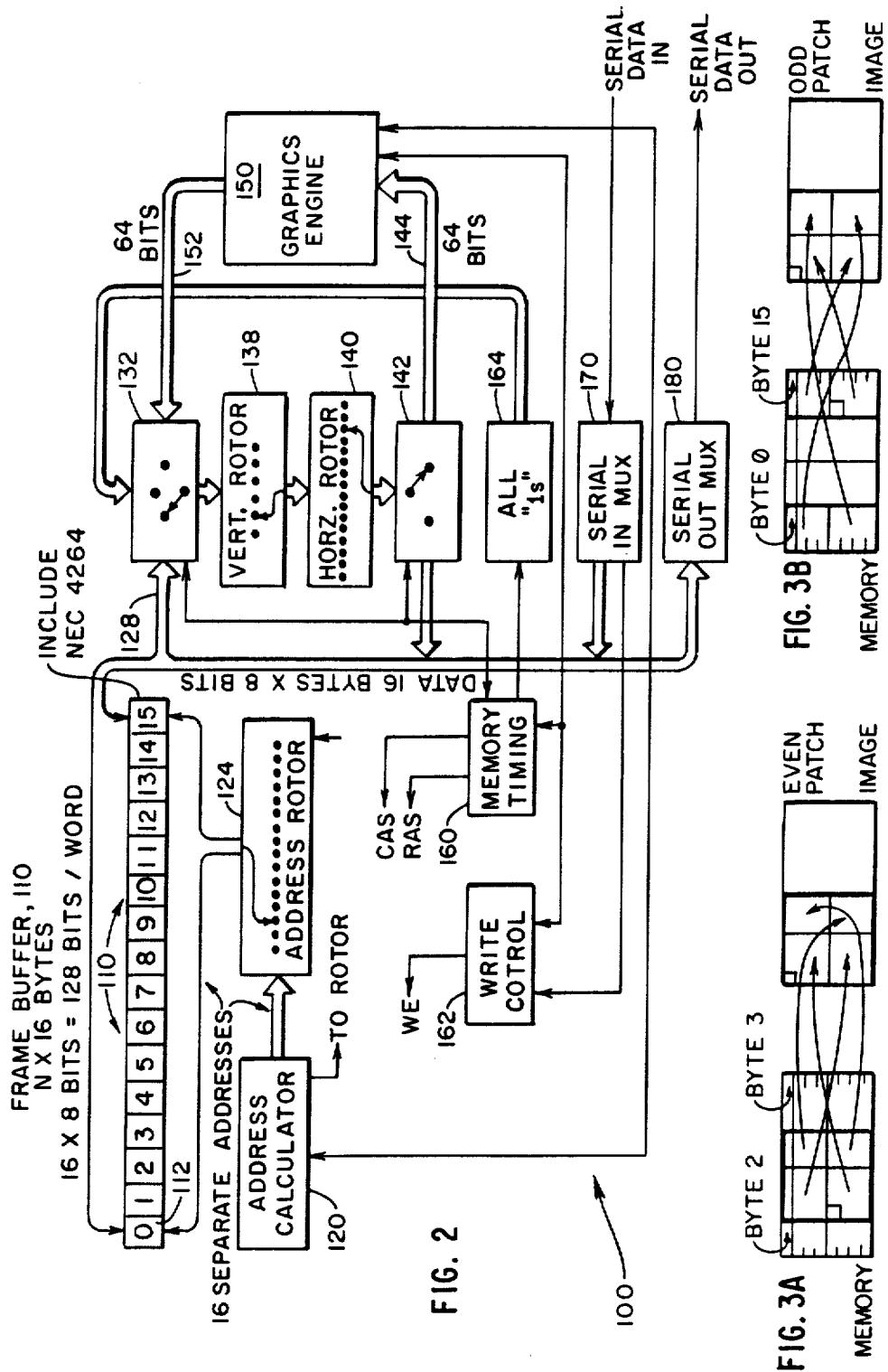

SERIAL DATA IN MUX, 170

SERIAL DATA OUT MUX, 180

HIGH-SPEED DUAL MODE GRAPHICS MEMORY

FIELD OF THE INVENTION

The present invention relates to graphics memories and, in particular, high-speed graphics memories having line mode and area mode data transfer.

BACKGROUND OF THE INVENTION

Graphics memories which include a plurality of random access memory (RAM) integrated circuits, typically arrange the data transfer in terms of a horizontally contiguous line segment. For instance, if the graphics memory includes 64 RAM's having a single data bit, the single data bits are serialized to form a single 64 pixel, horizontal line on the display device screen. The 64 pixels comprise a word, and the screen bit map is then represented by a sufficient number of words extending horizontally to complete the horizontal line at as many lines arranged vertically to fill the entire screen for the desired resolution. Obviously, for horizontal scanning display devices, such as the conventional NTSC Monitor, the horizontally contiguous arrangement of the RAM data signals provides rapid signal transfer. However, access to the graphics memory in any other geometric relationship, such as a vertical or diagonal line, or a two-dimensional area, requires more complex and time consuming graphics memory access arrangements. For instance, a vertical line would require 64 separate memory word transfer to access the 64 vertical pixels, by contrast with the single memory access necessary to provide the horizontal 64 pixel segment.

An alternate arrangement of the data from the individual RAM integrated circuits is suggested by Sproull, wherein the 64 elements are arranged in a two-dimensional 8×8 pixel portion of the graphics memory bit map. While some timing economies are achieved when the desired 8×8 area coincides with the boundary of the 8×8 portion, the access to data in arbitrarily aligned 8×8 portions require at least two row address strobe (RAS) cycles to access the patch, and additional time lost in subsequent data manipulation. More significantly, the organization of memory access to provide the 8×8 pixel access does not facilitate memory access in line mode, thereby requiring multiple access cycles and the addition of a separate line mode buffer for time access.

SUMMARY OF THE INVENTION

The present invention provides direct access to a 16×8 pixel portion of the graphics image in area mode, and a horizontally contiguous access to 128 pixels in line mode, of comparable graphics memory access time. The graphics memory according to the present invention orders a group of RAM integrated circuits into ascending sequence both horizontally and vertically, wherein a line mode data access provides data access to 16 separately addressable 8-bit bytes of data of a 128-bit contiguous horizontal line. However, when in area mode, the graphics memory according to the present invention provides simultaneous access to 16 8-bit data bytes, from which an 8×8 pixel area is extracted. Data transfer made in the area mode incurs no access time penalty over the line mode operation and vice versa, and the 8×8 pixel area is selectively aligned over any portion of the image.

The rapid access in the area mode is provided by selection and rotation of the address for the 16 individual byte RAM's, as well as horizontal and vertical rotation of the data incoming and outgoing from the graphics memory. The address and data rotors are operable at high speed, allowing the individual RAM memory cycles to operate at the maximum RAM speeds and efficiency available.

BRIEF DESCRIPTION OF THE DRAWING

These and other features according the present invention will be better understood by reading the following detailed description, taken together with the drawing, wherein:

FIG. 2 is a block diagram of the graphics memory system according to the present invention;

FIGS. 3A and 3B show horizontal and vertical data manipulation by the rotors of FIG. 2 for even and odd patch portions;

DETAILED DESCRIPTION OF THE INVENTION

Figure 1:
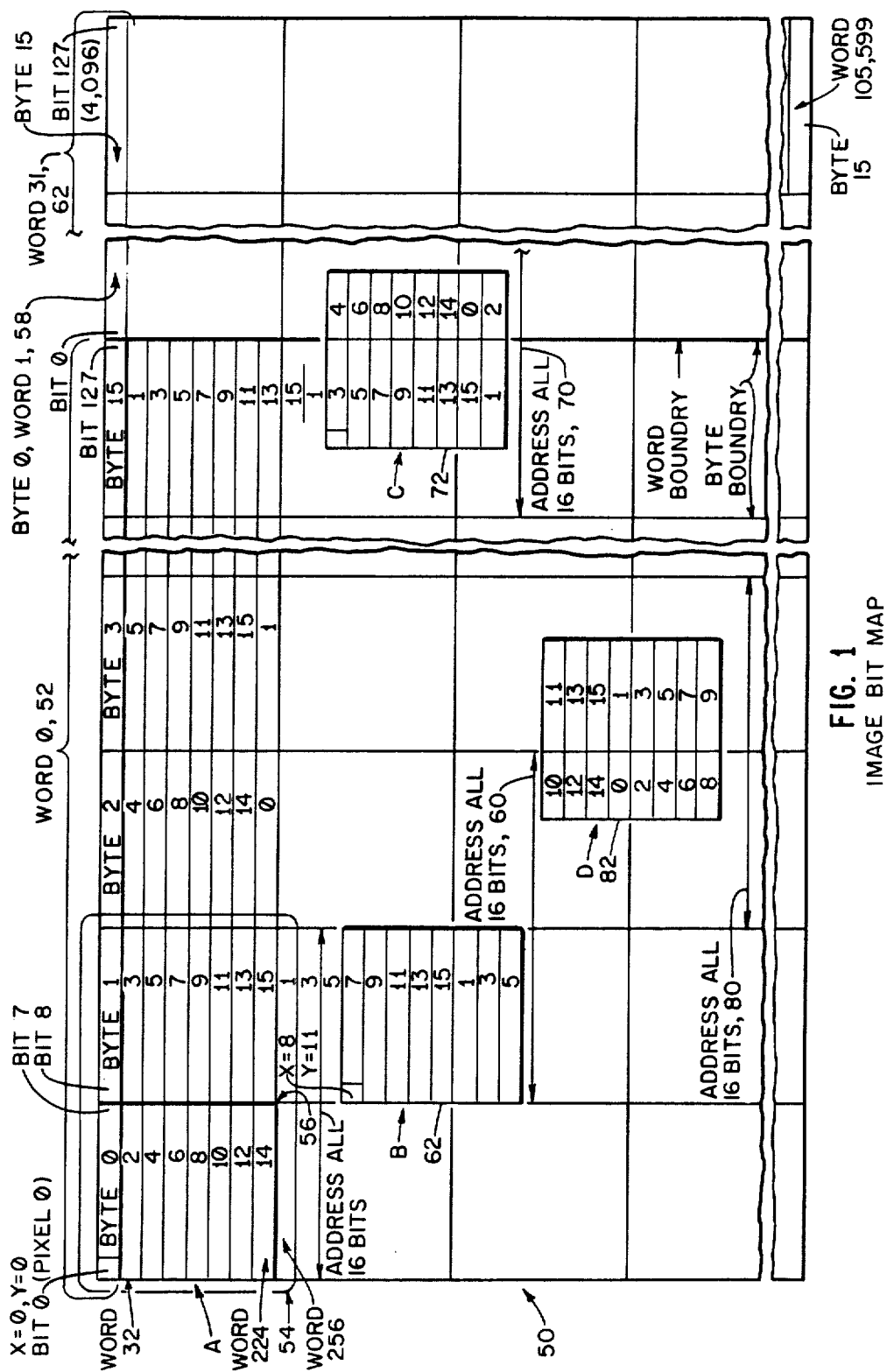
FIG. 1 is a bit map presentation of the memory allocation according to the present invention.

The graphics memory according to the present invention provides both line oriented data access and area oriented data access with equal access time. A graphics memory bit map 50 is shown in FIG. 1 wherein the allocation of the frame buffer 110 memory is illustrated. Line access is provided by recovering a 128-bit word 52 comprising N (N=16) contiguous and horizontally consecutive M-bit (M=8) bytes. Area access is provided by a rearrangement of the 16 bytes into two adjacent byte columns having 8 bytes per column providing a data area 54 of 128 bits. From the data area 54 an 8×8 data patch is subsequently extracted, illustrated by the patch 56, 60, 70 and 80, which will be explained as examples A, B, C and D, illustrating the addressing technique of the present invention below. The frame buffer 110 of FIG. 2 comprises memories which provide parallel 8-bit byte data input and output transfer. Each byte will respond to a completely independent address and provide the corresponding data. When the memory provides a line order data stream, all contiguous 16 bytes, byte 0 ... 15 receive the same address. In the example shown in FIG. 1, the upper left word is "word 0," the upper left byte is "byte 0," and the upper left bit is "bit 0," having the lowest address. Therefore, all 16 bytes in word 0, having the same address, will have the address 0 (shown below in Table I). The next word, word 1, extending to the right of word 0 comprises the address 1. The number of words continuous across the screen (in the present invention) having: 4096 points per line. The last word 62 is word 31, wherein all 16 bytes have the address 31. The next word, word 32, is at the left edge of the screen in the subsequent line beneath the first line, and all bytes therein have the address 32. The address of the words in line mode continues in this manner until the lower right word, word 105599 is addressed, having the address 105599. The address of the bytes comprising the words of memory is shown according to the generalized equation below:

$$ADDR = (Y \cdot LL) + X/128 \qquad (1)$$

where Y=a line number from 0 through 3299 and X=a bit location from 0 through 4095 in the preferred embodiment. Moreover, since the frame buffer of memory may comprise a portion of a larger memory, the lowest addressed bit, bit 0, in the upper left-hand corner may be located at a memory location other than 0, corresponding to a base address offset. Therefore, the above equation (1) can be compensated by the addition of a base address in the calculation of the byte address. The memory according to the present invention allows simultaeous access to the memory in a manner corresponding to an 8×16 bit, two-dimensional area by starting the word of each new line with a different byte, such that each byte included in the memory area 54 is different (from among the bytes 0-15), and comes from a separately addressable memory element 112 from the frame buffer 110 of FIG. 2. The particular sequence of bytes per word according to subsequent lines in the graphics memory according to the present invention provides that vertically sequential and contiguous words begin with a byte incremented by two from the byte immediately above, such that words 0, 32 . . . 224 begin with byte numbers 0 2 . . . 14, respectively. A subsequent vertically contiguous word, word 256, again begins with byte 0 and the subsequent vertically contiguous words increment by 2 to a maximum of 14, wherein the cycle is repeated until the bottom image line is addressed. Therefore, assuming the address and data for the bytes are provided with the proper value and in the proper sequence, information may be accessed with equal facility both in a line order format and in an area format.

A further feature of the present invention provides that data areas may be accessed to include any eight vertically contiguous pairs of bytes. As illustrated by the 8×8 bit patch areas 56, 62, 72 and 82 of data areas 54, 60, 70 and 80, the recovered 8×8 data may correspond exactly with even addressed boundaries, cross-vertical byte sequence boundaries, crossword boundaries and cross both byte and word boundaries, respectively. According to Example A of Table I below, the 8×8 patch 56 is recovered from a data area 54 wherein the bytes 0 and 1, part of word 0 in the line order format both have the address 0, the second and third bytes, contiguous and vertically sequential from byte 0 and 1, have the address 32. The address of the subsequent, downward consecutive and contiguous bytes increments by 32 (corresponding to the line length LL or the number of words per line) until the last byte in the data area 54 is addressed. The bytes 14 and 15 have the address 224. From this 8×16 bit area, the patch 56, comprising 8×8 bits is extracted by data rotation, discussed below with regard to FIGS. 2, 3A and 3B.

A second example (B) of area data access illustrates an 8×8 patch 62 recovered from a data area 60 which begins with an odd byte (7) on line 11. Since line 11 is not evenly divided by 8, the sequence of bytes addressed in the data area 60 begins with byte 7, and increments by two providing the vertical byte sequence of 7, 9, 11, 13, 15, 1, 3 and 5. According to the present invention, since the patch 62 may include portions of two horizontally bytes, such as the patch 72 and 82, discussed below, two horizontally contiguous 8-byte sets are recovered. However, as is the case with patch 56, discussed above, the patch is entirely contained within a single 8-byte set. According to the present invention, the addressed byte set which comprises the patch 62, as well as the byte set to the immediate right, is addressed. Therefore, the data area 60 from which the patch 62 is subsequently extracted by the data rotors of FIG. 3 includes the bytes numbered 8, 10, 12, 14, 0, 2, 4 and 6 to the left of the previously discussed bytes of patch 62, therefore providing an odd patch, by contrast to the patch 56 discussed above which comprises an even patch. The address for the bytes 7, 8 . . . 15, 0 . . . 6 is shown below in Table I, wherein the upper left byte is derived according to X=8 and Y=11.

A third example (C) is shown by the patch 72 from the data area 70 wherein the patch 72 crosses a word boundary and begins with byte 3. Here, X=120, Y=10, low byte=3 and start address=320. The patch 72, crossing two columns of bytes, includes bytes in sequence 3-15, 0-2. The corresponding byte addresses are shown under the column of Example C in Table I, discussed below. In this instance, the odd and even numbered bytes have a separate address since they are part of different words, wherein each word has a unique address. Therefore, for instance, the lowest ordered byte, byte 5, has an address of 320 and the next contiguous horizontal byte, byte 4, has an address of 321. A subsequently sequential vertically contiguous byte, byte 5, has the address 320 plus the line length (32) and byte 6 has the address 321 plus the line length, and so forth until bytes 3 and 4, which have the address of 320+7× the line length and 321+7× the line length, respectively.

A subsequent example (D) is shown wherein patch 82 is extracted from a data area 80, wherein the data area 80 includes even and odd numbered bytes, respectively. Since the patch 82 begins on line 20 wherein Y=20, and the lowest order byte provides X=16, the lowest order byte number, 10 and the corresponding horizontally adjacent byte 11 have the lowest address, 640. The byte address increments by integer multiples of the line length (32) until the last byte numbers, 8 and 9, have a corresponding address of 640+7× the line length.

TABLE I

|   |        | Line Order | 8 × 8 patch | | | |
|---|--------|-----------|-----------|-----------|-----------|-----------|
|   |        |           | Example A | Example B | Example C | Example D |
|   |        |           | X = 0     | X = 8     | X = 120   | X = 16    |
|   |        |           | Y = 0     | Y = 11    | Y = 10    | Y = 20    |
| 1 | Byte 0 | 0         | 0         | 352 + 4LL | 321 + 6LL | 640 + 3LL |
| 2 | 1      | 0         | 0         | 352 + 5LL | 320 + 7LL | 640 + 3LL |
| 3 | 2      | 0         | LL        | 352 + 5LL | 321 + 7LL | 640 + 4LL |
| 4 | 3      | 0         | LL        | 352 + 6LL | 320       | 640 + 4LL |
| 5 | 4      | 0         | 2*LL      | 352 + 6LL | 321       | 640 + 5LL |

TABLE I-continued

|   | Line Order | 8 × 8 patch | | | |
|---|---|---|---|---|---|
|   |   | Example A | Example B | Example C | Example D |
| 6 | 5 | 0 | 2*LL | 352 + 7LL | 320 + LL | 640 + 5LL |
| 7 | 6 | 0 | 3*LL | 352 + 7LL | 321 + LL | 640 + 6LL |
| 8 | 7 | 0 | 3*LL | 352 | 320 + 2LL | 640 + 6LL |
| 9 | 8 | 0 | 4*LL | 352 | 321 + 2LL | 640 + 7LL |
| 10 | 9 | 0 | 4*LL | 352 + LL | 320 + 3LL | 640 + 7LL |
| 11 | 10 | 0 | 5*LL | 352 + LL | 321 + 3LL | 640 |
| 12 | 11 | 0 | 5*LL | 352 + 2LL | 320 + 4LL | 640 |
| 13 | 12 | 0 | 6*LL | 352 + 2LL | 321 + 4LL | 640 + LL |
| 14 | 13 | 0 | 6*LL | 352 + 3LL | 320 + 5LL | 640 + LL |
| 15 | 14 | 0 | 7*LL | 352 + 3LL | 321 + 5LL | 640 + 2LL |
| 16 | 15 | 0 | 7*LL | 352 + 4LL | 320 + 6LL | 640 + 2LL |

The hardware structure according to the present invention which provides the bit map memory shown in the map 50 of FIG. 1 is shown in block diagram 100 of FIG. 2. The frame buffer 110 comprises the entirety of the image storage area, and includes 16 individually addressable memory elements, 112, which each provide 8 bits of parallel data, and correspond to a unique byte of the bytes numbered byte 0 through byte 15. Each memory element 112 includes four pairs of 64K×4 bit video RAM memory elements such as NEC 41264 as used in this embodiment of the present invention. As illustrated by the examples discussed above with regard to Table I, each memory element 112 receives its own address signal. In such situations, such as line order data access, all bytes receive the same address. In graphics mode where 8×8 patch areas are accessed, each memory element or pairs of memory elements receive unique addresses. The addresses as illustrated by Table I derived according to equation (1) are provided by an address calculator 120 which provides the 16 separate addresses to an address rotor 124 which aligns the ascending sequence of addresses provided by the address calculator 120 to the corresponding sequence of memory elements 112. As illustrated by FIG. 1 and Table I, the lowest addressed byte may not correspond to byte 0, depending on the boundary of the area. For instance, the lowest ordered byte for Example C is the fifth byte, which would require the addess rotor to align the lowest address from the address calculator 112 to byte 3 of the frame buffer 110, memory element 112.

Similarly, the data recovered from the frame buffer 110 or provided to the frame buffer 110 must be vertically aligned by vertical rotor 130 to correspond to the vertical alignment of the data area (54, 60, 70, 80) address and the address provided by the address rotor 124. The effect of the data rotation is illustrated by FIGS. 3a and FIGS. 3b showing the vertical exchange of data between the memory alignment of the byte and the image alignment of the byte data. The data rotors 130 and 140, as well as the address rotor 124, comprise an array of logic gates or other known circuits which provide the desired 8- or 16-bit rotation and simultaneous data transfer. The lowest addressed bit of the patch recovered is illustrated by a smaller square into the upper left corner of a subdivision in FIG. 3. The data provided to the vertical rotor 130 is provided along a 16-byte, 8-bit data bus 128 which when selected by switch 132 is placed in a two-dimensional array configuration in the rotor 130 wherein the data manipulation illustrated by FIGS. 3a and 3b are provided.

Subsequent to the vertical rotor 130, the data is horizontally rotated by the horizontal rotor 140 which provides the data manipulation again illustrated by FIGS. 3a and 3b. The data recovered from the frame buffer and rotated by the vertical rotor 130 and rotated by the horizontal rotor 140 is received by the graphics engine 150 through switch 142. The graphics engine may comprise a number of suitable data manipulation calculators known in the art which perform such operations as masking, clipping, rotation or inversion on two-dimensional data arrays and receive the data over a data path 144 which extracts 64 bits of data corresponding to the receovered patch, from the recovered data area having 128 bits of data. The graphics engine 150 provides data to the frame buffer 110 over data path 152 having 64 bits of data, which is received by the vertical rotor through swtich 132 when the switch is selecting the data from the graphics engine. The vertical rotor provides vertical rotation of the two-dimensional data on path 152 to become aligned in the proper vertical orientation to coincide with the desired two-dimensional 8×8 patch on the image bit map. The data is subsequently horizontally rotated by horizontal rotor 140 and placed on the 128-bit data bus by switch 142.

In the embodiment of the present invention, the frame buffer elements 112 include video RAM components such as NEC41264, manufactured by Nippon Electric Corporation of Japan, the corresponding data sheet and application information being incorporated by reference. The individual bits of the video memory elements may be individually writted into by selective masking of the write enable signal within the memory element. In the case of the NEC41264, the data bits to be written into will be preceded by a write enable mask value of 1. The data bits which are to retain the previously stored information will receive a mask value of 0 during the row address select (RAS) memory signal by generating all 1's (164) which are rotated into the same position as is the subsequent data which pass through switch 132 and rotors 130 and 140. Thereafter, when the write enable signal, provided by write control 162 is generated, the column address strobe (CAS), provided by the memory timing circuit 160 causes the data present on the data bus 128 to be received by specifically selected data its within each memory element 112 memory component.

Figure 4:
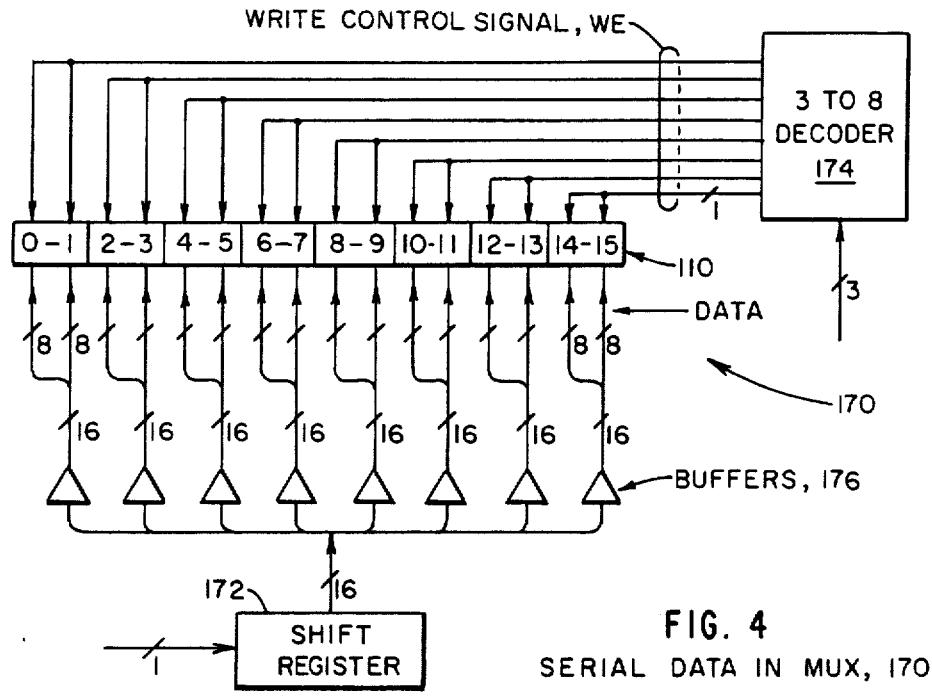
FIG. 4 is a block diagram of the serial data input multiplexer.

Serial line-oriented data may be written into the frame buffer 110 by first transforming a serial flow of 128 bits of data into 2 bytes, 8 bits each by a shift register 172. The byte addresses for line-oriented data transfer is discussed above with regard to Table I. For clarity, the address leads are not included in FIGS. 4 or 5 and may be provided according to the disclosure elsewhere herein together with address signals and connections of memory devices known in the art. The 2 bytes of data are presented to all pairs of 8-bit data input terminals of the frame buffer memory element (112) in parallel. Individual groups of four memory elements (112) may be selected according to write enable signals selected by a 3-to-8 decoder 174.

The decoder 174 selects the pair of bytes to be written by adding the rotation of the line (Y) on which the word appears to the byte address (Addr) being written as follows:

$$\text{first byte} = (Y * 2) + \text{Addr} [3:0] \bmod 16 \qquad (2)$$

$$\text{second byte} = (Y * 2) + \text{Addr} [3:0] + 1 \bmod 16 \qquad (3)$$

Figure 5:
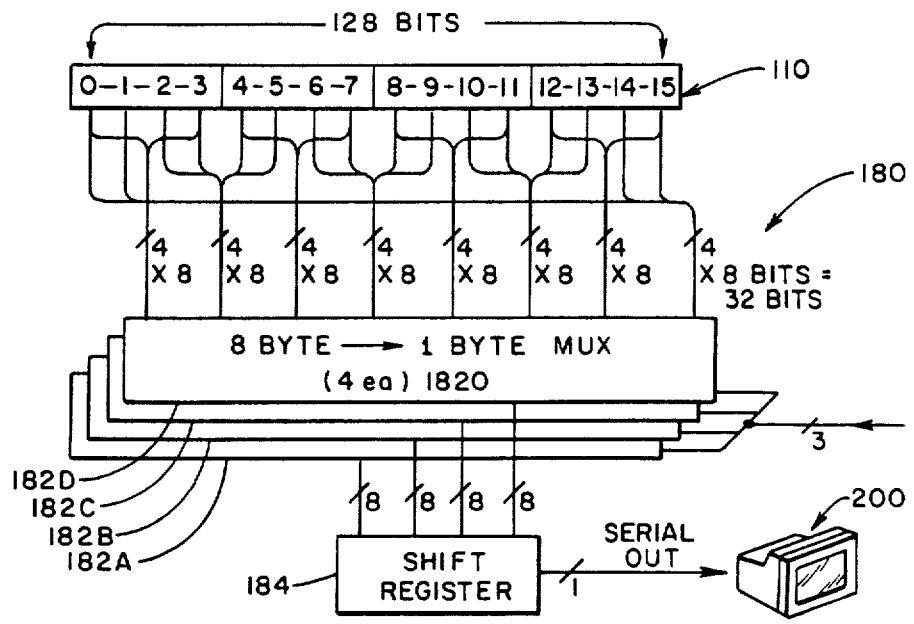
FIG. 5 is a block diagram of the serial line output multiplexer.

Serial data output is provided by a serial output multiplexer 180, shown in more detail in FIG. 5. The 128-bit signal of the frame buffer 110 is received by four 8-byte to 1-byte multiplexers 182 which each receive every second byte from the 16-byte 128-bit word. For instance, the first multiplexer 182A receives 8 bytes of data, including bytes 0, 2, 4, 6, 8, 10, 12 and 14, the second multiplexer 182b receives bytes 1, 3, 5, 7, 9, 11, 13 and 15, the third receives bytes 2, 4, 6 . . . and so forth. One of the eight bytes is selected by each of the four portions of the multiplexer according to three address bits provided by the address calculator 120 of FIG. 2, and provides a total of four signals of data including 8 bits each. As with the serial data input address, the Y value is the line number and the address is the byte address which increments by 4 for each 32 bits. The select signal for the first two of the four 8-to-1 byte multiplexers (182A, B, C and D) is given by equations (1) and (2), above. The 4 bytes of data are received by a serial out 32-bit shift register 184 which provides a serial data stream to the display device 200, which typically comprises a high resolution graphic display.

Modifications, substitutions and other embodiments of the present invention by one skilled in the art are within the scope of the present invention. For instance, the ordering of the bytes and other numeric sequence so that alternate data areas (or data volumes for three-dimensional memories) may be addressed with equal facility are within the present invention. Moreover, the switching of data flow such as with switches 132 and 142 may be provided by tri-state logic and other equivalent components and techniques. Each pixel of the present embodiment of the invention is equal to one bit; alternate embodiments may include multiple bits per pixel and provision for grey scale or color pallet implementations. Furthermore, the present invention may apply to a three-dimensional graphics memory wherein volumes of picture data are addressed according to the techniques described herein. Therefore, the present invention is not limited except by the claims which follow:

What is claimed is:

1. A graphics memory providing rapid pixel data access to linearly contiguous pixels and to multi-dimensionally contiguous pixels, comprising:

a frame buffer including a plurality of N memory sections each having a plurality of memory section locations, each said memory sections being responsive to a unique address and providing a simultaneous data path to at least one correspondingly addressed memory location of each said memory sections;

address generator means for providing an address signal to each said memory section and being operable in a line mode and an area mode, wherein
said address generator line mode operation provides a first set of address signals to said plurality of memory sections providing data access to linearly contiguous pixels,
said address generator area mode operation provides a second set of address signals to said plurality of memory sections providing data access to multi-dimensionally contiguous pixels;
said N memory sections are juxtaposed to provided unique corresponding memory section addresses for any selected area in said area mode; and data alignment means for providing a data path to at least one of linearly contiguous pixel data and multi-dimensionally contiguous pixel data from said frame buffer in response to said address generator means.

2. The graphics memory of claim 1, wherein said multi-dimensionally contiguous pixels include a two-dimensional area.

3. The graphics memory of claim 2, wherein said frame buffer provides a data path to a 16 pixel by 8 pixel area in response to said second set of address signals.

4. The graphics memory of claim 2, wherein said alignment means includes means for providing an area subset from the data paths provided in response to said second set of address signals.

5. The graphics memory of claim 4, wherein said data alignment means includes data rotor means for alignment of the two-dimensional data path to the memory sections addressed according to said second set of address signals.

6. The graphic memory of claim 5, wherein
each said memory section provides a byte of data comprising 8 contiguous pixels, and
said plurality of memory sections provides an area of 2 bytes by 8 pixels according to said second set of address signals, and
said data rotor means comprises a horizontal and a vertical data rotor.

7. The graphics memory of claim 6, further including address rotor means providing alignment of said second set of address signals to provide said two-dimensionally contiguous pixels.

8. A graphics memory comprising,
a frame buffer having a multi-dimensional array of memory locations corresponding to multi-dimensional picture elements, each having a unique corresponding address, said frame buffer including a plurality of at least N memory sections each said memory section providing a simultaneous data path to M picture elements being contiguous in a first dimension and being simultaneously addressed by a first portion and a second portion of said picture element address, said memory sections being relatively disposed in a second dimension to provide unique first portions addresses for any contiguous area including at least one picture element and N or less memory sections, each said memory section being responsive to a second portion of said picture element address corresponding to the location of said contiguous area in said multidimensional array; and an address generator for selectively providing said first and said second portions of said picture element addresses according to the location of said selected contiguous area.

9. The graphics memory of claim 8 wherein said first portions of said pixel address is module-N unique.

10. The graphics memory of claim 9, further providing selectively data paths to a linearly contiguous area of one pixel-by-N times M pixels.

11. (New) The graphics memory of claim 9, further including:

data output means for receiving picture element data and providing a corresponding signal; and data alignment means for selectively transferring this picture element data from said N memory sections to said output means and for selectively multi-dimensionally rotating said picture element data according to the selected first portion address and the corresponding selected contiguous area.

12. The graphics memory of claim 8, wherein each said memory section provides simultaneous pixel data paths.

13. The graphics memory of claim 12, wherein N=16, and, said selected contiguous area comprises an 8-by-8 pixel area.

* * * * *